United States Patent [19]

Xuan

[11] Patent Number: 4,546,278
[45] Date of Patent: Oct. 8, 1985

[54] WINDING FOR SUBJECTING THE ROTOR OF A STEPPING MOTOR TO TWO MAGNETIC FIELDS SYMMETRIC TO TWO PERPENDICULAR AXES BY ENERGIZATION OF ONE WINDING

[75] Inventor: Mai T. Xuan, Chavannes, Switzerland

[73] Assignee: Omega SA, Bienne, Switzerland

[21] Appl. No.: 625,148

[22] Filed: Jun. 27, 1984

[30] Foreign Application Priority Data

Jul. 6, 1983 [CH] Switzerland .......................... 3699/83

[51] Int. Cl.⁴ ............................................ H02K 37/00
[52] U.S. Cl. .................................... 310/49 R; 310/162
[58] Field of Search ............. 310/49 R, 40 MM, 162, 310/163, 42, 164; 318/696; 368/157, 160

[56] References Cited

U.S. PATENT DOCUMENTS

| | | | |
|---|---|---|---|
| 2,010,869 | 8/1935 | Lilja | 310/42 |
| 2,402,380 | 6/1946 | Dicke | 310/163 |
| 3,052,806 | 9/1962 | Lee | 310/163 |
| 4,361,790 | 11/1982 | Laesser et al. | 310/49 R |

FOREIGN PATENT DOCUMENTS

| | | | |
|---|---|---|---|
| 2644231 | 4/1977 | Fed. Rep. of Germany | 310/49 R |
| 811428 | 3/1981 | U.S.S.R. | 310/49 R |

*Primary Examiner*—Peter S. Wong
*Assistant Examiner*—D. L. Rebsch
*Attorney, Agent, or Firm*—Griffin, Branigan & Butler

[57] ABSTRACT

The electromagnetic stepping motor comprises a first winding (g) and at least one second winding ($p_1$). The stator (1) has four polar expansions (10, 11, 12, 13) surrounding the rotor (2) such expansions being separated by slots or saturable necks (6, 7, 8, 9). The flux generated by energization of the first winding is separated into two parts ($\phi_1$, $\phi_2$) of which one ($\phi_2$) passes through the core of the second winding ($p_1$) in order to subject the rotor to two magnetic fields which are substantially symmetric relative to two perpendicular axes (x, y). According to the connection of the windings and the signals applied, the motor may step forward or backward, or in either sense at an accelerated speed. Such a motor is particularly suited to drive a timepiece movement.

3 Claims, 16 Drawing Figures

WINDING FOR SUBJECTING THE ROTOR OF A STEPPING MOTOR TO TWO MAGNETIC FIELDS SYMMETRIC TO TWO PERPENDICULAR AXES BY ENERGIZATION OF ONE WINDING

This invention concerns an electromagnetic stepping motor particularly intended to drive a timepiece movement and comprising a stator and a magnetized rotor, the magnetic circuit of said stator bearing a first winding and at least one second winding.

BACKGROUND OF THE INVENTION

A motor generally corresponding to this description is to be found mentioned in various prior art publications, for instance in the U.S. Pat. No. 4,361,790 in which will be found described an electromagnetic motor having two rotation senses and which includes a magnetic circuit having two windings simultaneously energized. This arrangement essentially provides a stator exhibiting three polar expansions surrounding the rotor, one of which is common to two windings, the other two being respectively dependent on each of said windings. By the principle of flux conservation it follows that such an arrangement exerts an attractive force on the rotor directed towards the common polar expansion which is twice as high as the force which is exerted towards the two other polar expansions. From this it may be reasonably concluded that this one-sided magnetic attraction by the mechanical imbalance which it brings about will cause stresses on the motor bearings and axis so as to provoke wear, shortening the life of the motor.

SUMMARY OF THE INVENTION

The foregoing difficulty is overcome by the present invention which comprises an electromagnetic stepping motor adapted in particular to drive a timepiece movement comprising a stator and a magnetized rotor the magnetic circuit of said stator including a first winding and at least one second winding, each wound around a corresponding core, said stator having four polar expansions separated by saturable necks or slots, said stator magnetic circuit being arranged in a manner such that the flux generated by energizing the first winding is separated in the core into two substantially equal parts, one of which passes through the core of each second winding, to subject the rotor to two magnetic fields which are substantially symmetric relative to two perpendicular axes.

BRIEF DESCRIPTION OF THE DRAWINGS

FIG. 1b is a single-phase arrangement of the motor shown in FIG. 1a.

DETAILED DESCRIPTION OF THE INVENTION

Figure 1A:
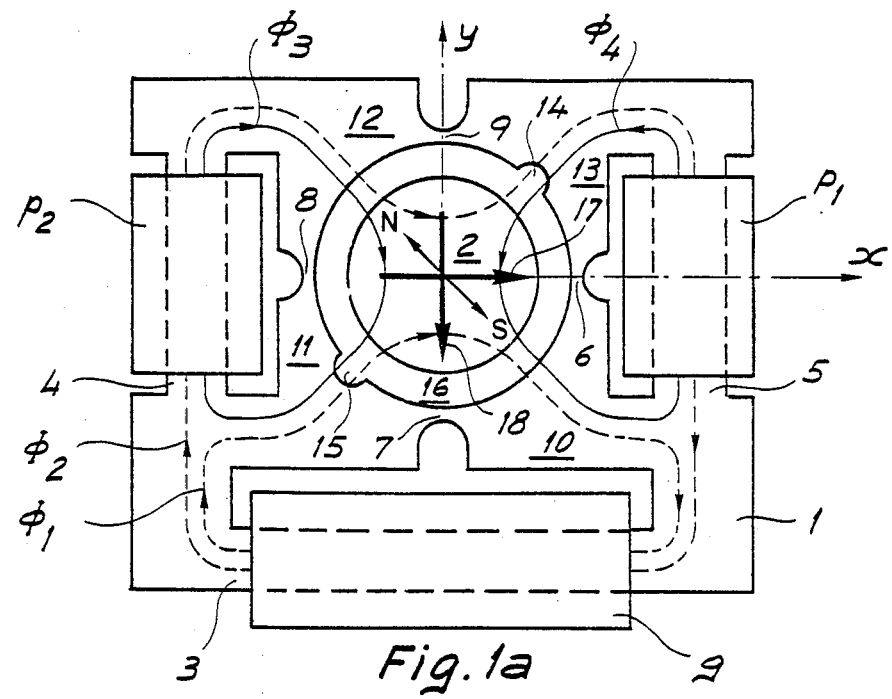
FIG. 1a is a schematic representation of a first form of the motor in accordance with the invention wherein the stator bears a first winding and two second windings in a two-phase arrangement.

FIG. 1a is a schematic representation of the motor in accordance with the first variant of the invention. It comprises essentially a stator 1 and a rotor 2. The stator bears a first winding g and two second windings $p_1$ and $p_2$. In a preferred version of the invention, winding g is provided with twice as many turns as each of windings $p_1$ and $p_2$. The winding g is wound on core 3 and windings $p_1$ and $p_2$ are wound on cores 5 and 4 respectively. Cores 3, 4 and 5 are continuous, with the stator more generally designated as 1, and form an integral part thereof. The central part of stator 1 is open and rotor 2 is placed in this opening. The opening boundary and the rotor are separated by the air gap 16. Further arranged in the central portion of the stator are four cut-outs in half-moon form in order to provide saturable necks 6, 7, 8 and 9. It is well understood that these may be replaced by slots or air-gaps. From this arrangement it will be seen that the stator comprises four polar expansions, or pole shoes 10, 11, 12 and 13. Finally two further cut-outs 14 and 15 formed in the interior boundary wall of the opening of the stator define a positioning angle for the rotor when the windings are not energized. As to the rotor, it comprises a permanent magnet of which the sense of magnetization is diametrically oriented. At rest, its position is that indicated on the figure according to the double arrow N - S.

In the arrangement shown in FIG. 1a, it will be observed that the energizing of winding g generates a flux which is divided into two substantially equal portions in order to subject the rotor to the magnetic field issuing from each winding: flux $\phi_1$ which arrives directly at the air gap and flux $\phi_2$ which in order to arrive at said air gap must pass through cores 4 and 5 of the windings $p_1$ and $p_2$. Thus in this arrangement magnetic fields corresponding to the fluxes $\phi_1$ and $\phi_2$ which act on the rotor are substantially symmetric relative to the two perpendicular axes x and y as shown on FIG. 1a. From this it will be understood that the resulting axis of these fields is parallel to axis x and directed in the sense of the arrow 17. The sense will be opposite to that of arrow 17 when winding g is energized by an opposite sense pulse.

Two cases may now be observed according to whether the windings $p_1$ and $p_2$ are energized in phase or in phase opposition.

Figure 2:
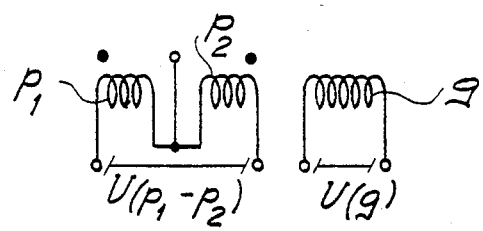
FIG. 2 shows how the windings of the motor of FIG. 1a are connected for a two phase operation.

Consider initially the case where windings $p_1$ and $p_2$ are energized in phase opposition. FIG. 2 shows how the windings are connected, the dots symbolizing the winding sense. FIG. 2 further shows the relationship of the windings $p_1$ and $p_2$ to winding g which is independent. At this moment, flux $\phi_3$ and $\phi_4$ issuing from windings $p_2$ and $p_1$ respectively arrive as shown on FIG. 1a. The axis of the resulting field corresponding to $\phi_3$ and $\phi_4$ is directed in the sense of arrow 18. It will be immediately seen that the axis of the field designated by arrow 17 coming from winding g and the axis of the field designated by arrow 18 coming from windings $p_1$ and $p_2$ connected in phase opposition are perpendicular.

Under these conditions reference will be made to the diagram of FIG. 3 which represents the value of couples C which act on the rotor as a function of its rotation angle $\alpha$. The forward rotation is that of the positive values of $\alpha$, and the reverse rotation that of the negative values of $\alpha$. It will be here recalled that the rotor of an electromagnetic stepping motor is subjected to at least two types of couples: a static positioning couple Ca due to the magnet alone and a dynamic motor couple or mutual couple Cab due to the interaction of the flux of the magnet with the flux of the winding when the latter is energized. Points $S_2'$, $S_1$ and $S_2$ are points of stable equilibrium in the absence of current and correspond to the position of the rotor indicated N - S on FIG. 1a, while points $I_1'$, $I_1$ and $I_2$ are points of unstable equilibrium and correspond to a position of the rotor where the axis N - S is aligned with the cut-outs 14 and 15 indicated on FIG. 1a.

Figure 3:
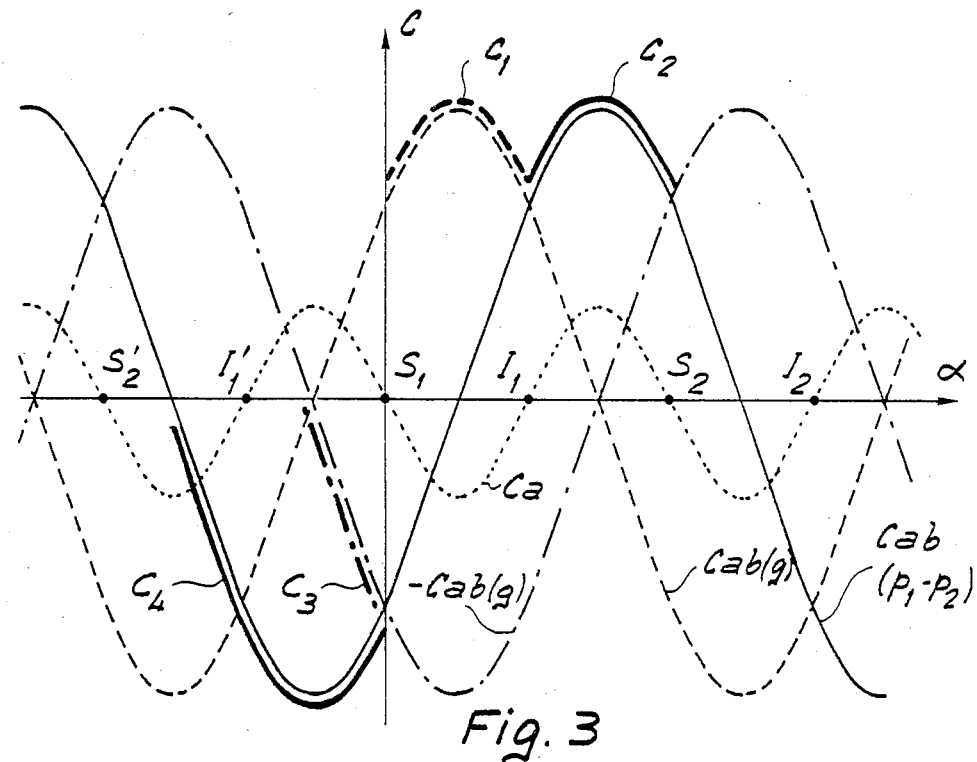
FIG. 3 shows the value of the couples as a function of the rotation angle of the motor in two phase operation.

On FIG. 3 there is shown the mutual couple of the winding g, Cab(g) and the mutual couple of the two windings $p_1$ and $p_2$ energized in phase opposition, Cab ($p_1$ -$p_2$). These two couples are separated by 90° in accordance with the explanations given above. The curve Cab(g) results from energizing winding g with a constant current and the curve - Cab(g), from energization of winding g with constant current but of opposite sign. The curve Cab ($p_1$ -$p_2$) results from energization of windings $p_1$ and $p_2$ arranged as shown on FIG. 2 with constant current. In order not to overcharge the drawing, the curve - Cab ($p_1$ -$p_2$) has not been shown.

Should one consider a motor having only one winding g, such would be a classic single phase motor. In such case, the rotor is brought from the rest position $S_1$ to position $S_2$ by the mutual couple Cab(g) which is sufficient to traverse an angle $\alpha$ slightly greater that that of position $I_1$, the remainder of the travel being effected thanks to the kinetic and potential energy stored during energization. In this case, however, it is known that it is not possible to drive the motor in reverse operation, in view of the fact that the usable energy - Cab(g) which may be provided to the motor is less than the positioning energy.

The motor in accordance with the invention, in view of its winding g and the two windings $p_1$ and $p_2$ connected in phase operation, acts as a two phase motor with perpendicular fields as shown in FIG. 1a. It is thus capable of turning in one sense or the other in accordance with the pulses which are applied to its windings. According to the motor parameters and the mechanical couples to be overcome, there will be chosen an arrangement of pulses the best adapted to the task. Herein will be shown as an example two possible energizations, one for forward rotation and the other for reverse rotation.

Figure 4A:
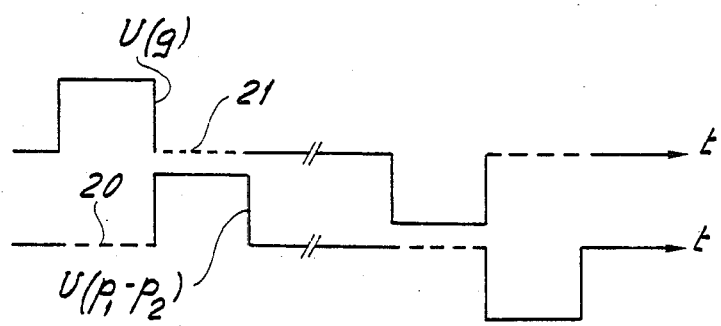
FIGS. 4a and 4b show an example of pulses applied to the windings in two phase start-stop operation for the forward and reverse operation respectively.

FIG. 4a shows in its upper line the feed voltage U(g) in winding g and, in the lower line, the feed voltage U($p_1$ -$p_2$) in windings $p_1$ and $p_2$ with the purpose of causing the rotor to rotate forwardly. If reference is made to FIG. 3, voltage U(g) is maintained on g during the time required in order that the rotor develops couple $C_1$ and turns from position $S_1$ to position $I_1$, then windings $p_1$ and $p_2$ take over the charge if one energizes them by means of the voltage U($p_1$ -$p_2$) likewise maintained during a time sufficient in order to be assured that the rotor develops a couple $C_2$ necessary to bring about rotation through 180°. It will then be positioned at point $S_2$. Following a lapse of time, the energizations are inverted in order to effect the next step. FIG. 4a shows also that when g is energized windings $p_1$ and $p_2$ are open-circuited (dotted line 20) then, when windings $p_1$ and $p_2$ are energized it is winding g which is open-circuited (dotted line 21). This arrangement is necessary since otherwise a counter-electromotive force would arise in the non-energized winding which would brake the rotor advance.

Figure 4B:
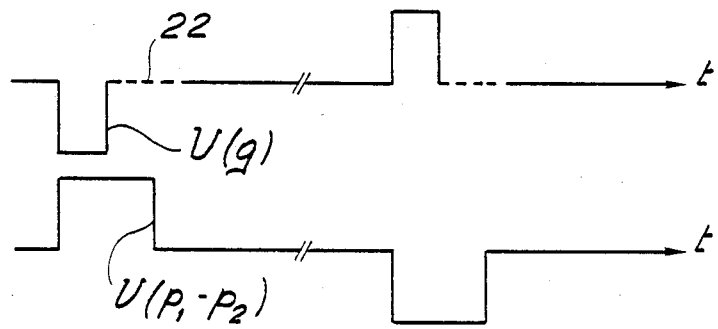

FIG. 4b shows in the upper line the feed voltage U(g) in winding g and in the lower line the feed voltage U($p_1$ -$p_2$) with the purpose of causing the rotor to turn in the reverse sense. It is thus concerned with bringing the rotor from position $S_1$ to position $S_2'$. In order to effect this and as seen from FIG. 3, the winding g is energized by a voltage - U(g) in order to develop couple $C_3$ which is interrupted before the rotor has turned through 45°. Windings $p_1$ and $p_2$ are also energized by means of the voltage U($p_1$ -$p_2$) in order to develop couple $C_4$. Couple $C_4$ is maintained during a time sufficiently long for the motor to arrive at the new point $S_2'$. Thus it will be observed that for reverse operation it will be necessary (for the motor and the parameters thereof as chosen it will be recalled) to foresee initially two simultaneous pulses of inverted polarity energizing each the two types of windings present, then a single pulse energizing only windings $p_1$ and $p_2$. Following a lapse of time, the energizations are inverted in order to traverse the next step. The same arrangements as that discussed relative to FIG. 4a are taken here in order to avoid short-circuiting the winding g during the time when windings $p_1$ and $p_2$ continue to be energized (dotted line 22).

Figure 4C:
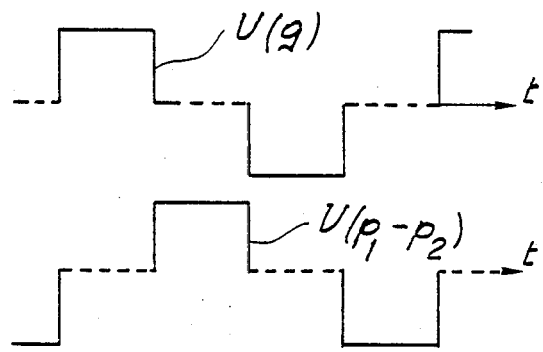
FIGS. 4c and 4d show an example of pulses applied to the windings in two phase operation and accelerated speed for the forward and reverse operation respectively.
Figure 4D:
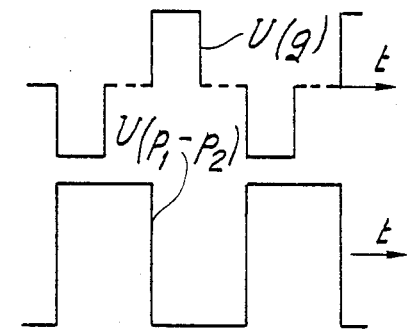

The explanations which have just been given concern a motor having a start-stop operation where the rotor makes one step per second in order to cause for example a a sweep second hand of a watch to advance one second at a time. In certain cases, it is advantageous to drive the second hand forwardly or in reverse at high speed, for example in order to display an alarm time or the changing of a time zone. The motor according to the invention is equally suited to this type of operation since it is sufficient to suppress the stop periods, separating the groups of alternating pulses. This brings us to the diagrams of FIG. 4c for the rapid advance and FIG. 4d for the rapid reverse rotations.

Figure 5:
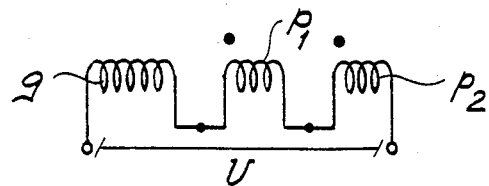
FIG. 5 shows how the windings of the motor of FIG. 1a are connected for single phase operation.
Figure 1B:
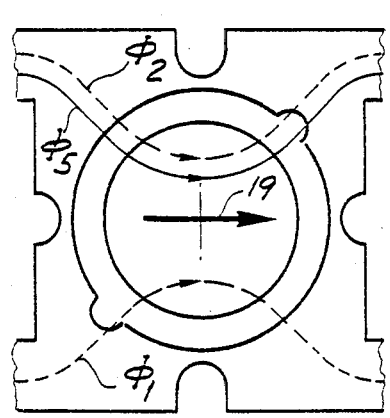

There will now be considered the case wherein windings $p_1$ and $p_2$ of the motor are energized in phase. In this case, as may be seen from FIG. 5, winding g and the two windings $p_1$ and $p_2$ (in which one will note the dots symbolizing the winding sense) are all energized in series by means of pulses of amplitude U. The arrangement of the fluxes in the region of the motor is then modified and shown schematically in FIG. 1b in which the arrangement of the windings (not shown) is identical to that of the motor shown in FIG. 1a.

As has already been explained, energization of winding g gives rise to a flux which is divided into two parts: $\phi_1$ and $\phi_2$. Since windings $p_1$ and $p_2$ are energized in phase, the combination of their flux gives rise to flux $\phi_5$ which appears on FIG. 1b. Flux $\phi_5$ has the same direction and sense as the fluxes $\phi_1$ and $\phi_2$ and it may be shown that its amplitude is substantially equal to the amplitude of the combined fluxes $\phi_1$ and $\phi_2$. The resultant axis of flux $\phi_5$ and the fluxes $\phi_1$ and $\phi_2$ combined accordingly subjects the rotor to a field of which the resultant is directed in the sense of the arrow 19. Thus, in other terms, the axis of the two magnetic fields generated by the winding g and that generated by windings $p_1$ and $p_2$ energized in phase have the same sense and direction.

Figure 6:
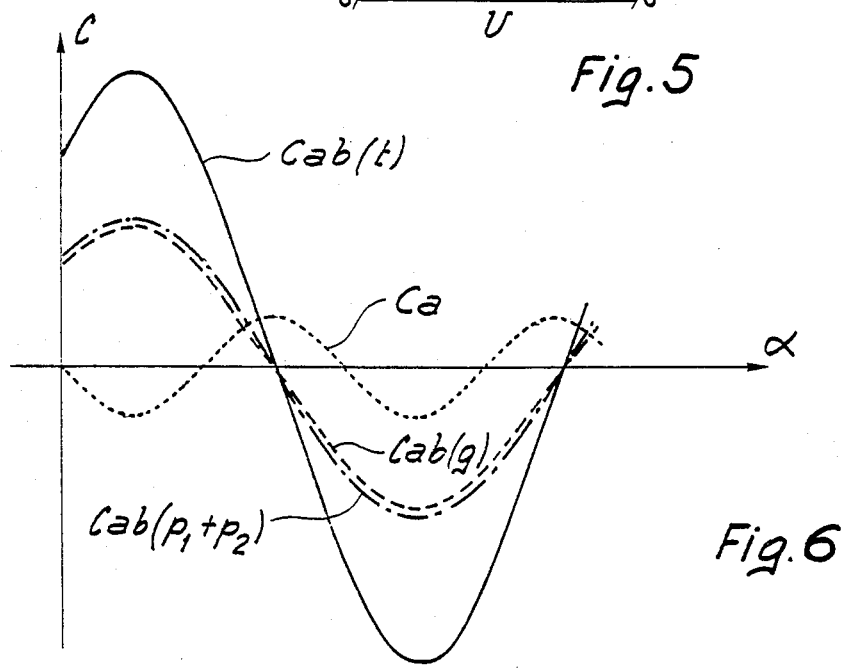
FIG. 6 shows the value of the couples as a function of the rotation angle of the rotor in single phase operation.

On FIG. 6, there has been shown the positioning couple Ca, the mutual couple due to winding g, Cab(g) and the mutual couple due to the two windings $p_1$ and $p_2$ energized in phase, Cab ($p_1+p_2$). The mutual couples are in phase and have the same amplitude. There results therefrom a couple Cab(t) twice as great as that which can be used each time that the motor must overcome a load greater than usual.

Figure 7:
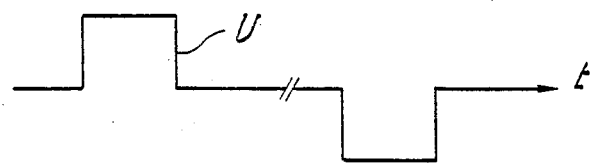
FIG. 7 shows an example of pulses applied to the windings in single phase start-stop operation for forward rotation.

The motor behaves here as a single-phase motor with a single preferential sense of rotation. It is energized by means of classic bipolar pulses as shown in FIG. 7.

Figure 8:
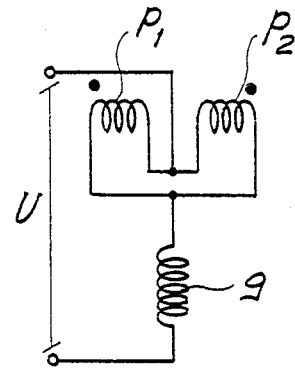
FIG. 8 shows as a variant how the windings of the motor of FIG. 1a may be connected for single phase operation.

It may be desired to employ the motor for a predetermined product according to one or the other of the connections which has just been described. It must be noted however that going from the connection shown in FIG. 2 (two-phase) to the connection shown in FIG. 5 (single phase) necessitates crossing the windings $p_1$ and $p_2$ and thus having accessible the four wires of said windings. In order to simplify the switching one may use the connection schema shown in FIG. 8. This arrangement is equivalent to that shown in FIG. 5 and has the advantage of enabling for windings $p_1$ and $p_2$ the same connection scheme as shown in FIG. 2. Three outlets only are necessary for the group of windings $p_1$ and $p_2$ when one wishes to go from one arrangement to the other.

Figure 9:
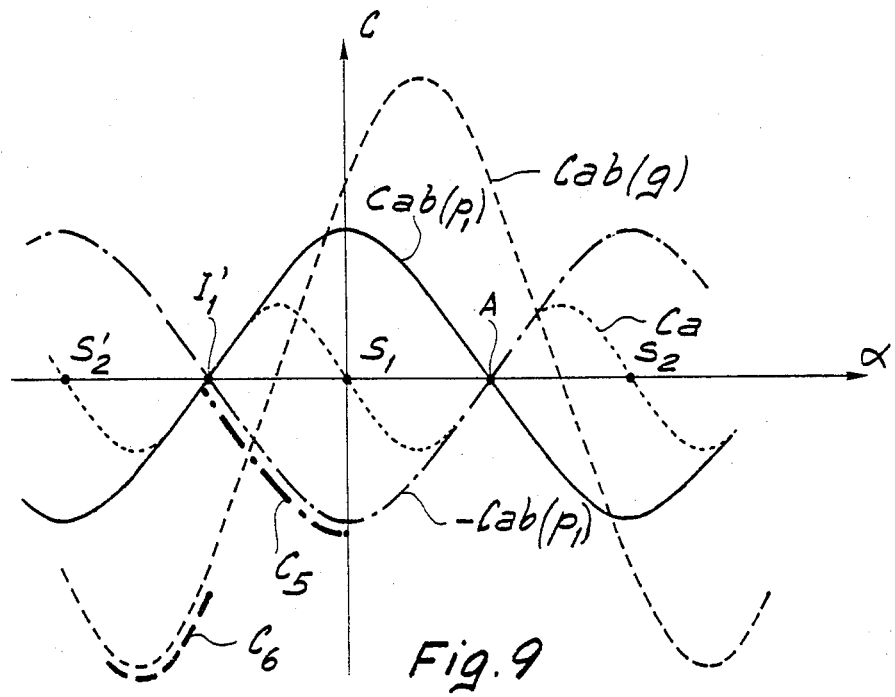
FIG. 9 shows the value of the couples in a motor in accordance with a second form of the invention wherein the stator of the motor bears only one second winding.

The second variant of the motor according to the invention such as will be described hereinafter comprises likewise a diametrically magnetized rotor, a stator comprising four pole shoes and a first winding g. It is distinguished from the motor shown in FIG. 1a by comprising only one second winding $p_1$. Under these conditions and without its being necessary to follow the flux path, it will be understood that the diagram of FIG. 9 shows a mutual couple due to the winding g, Cab(g) as already described and a mutual couple due to the winding $p_1$, Cab($p_1$), separated by 45° relative to the couple Cab(g) and of amplitude half that of the amplitude of the couple Cab(g) since it is assumed that winding $p_1$ has half as many turns as winding g. Effectively in this variant the resultant axis of the two magnetic fields generated by the first winding g and that generated by the second winding $p_1$ are substantially at an angle of 45°.

This motor is likewise capable of rotating in both senses, and hereinafter will be shown two possible energization schemes for each of these two senses.

Figure 10A:
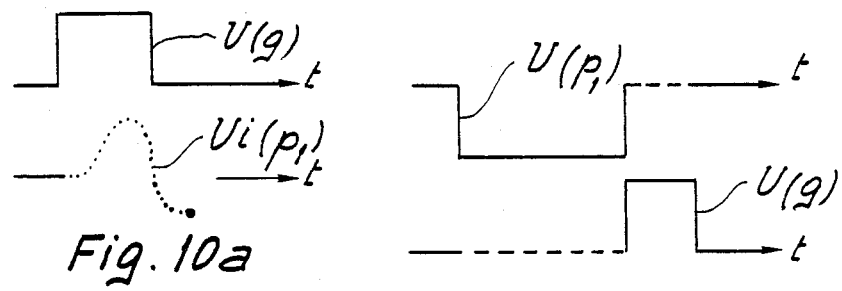
FIGS. 10a and 10b show an example of pulses applied to the motor according to the second form of the invention in the case of forward rotation with slaving (single phase) and reverse operation (two phase) respectively for the start-stop operation.

For the forward rotation the single winding g is energized and the pulse shown in FIG. 10a will be chosen with a length suitable to cause the rotor to turn from position $S_1$ to position $S_2$. Here, one is concerned with a simple single-phase motor. Since one has available winding $p_1$ not used for driving the rotor, one may employ it as a sensing winding which will provide an induced voltage Ui($p_1$) at its terminals whenever the rotor turns. When couple Ca passes through zero at point A one is assured that the rotor will be able to terminate its angular step by its own means (kinetic and potential energy) and it is at this moment that one interrupts the pulse U(g). The passage at point A is detected by winding $p_1$ which presents at this moment a sign inversion of the voltage Ui($p_1$). This sign inversion then serves as a signal for cutting off the control pulse U(g).

Figure 11:
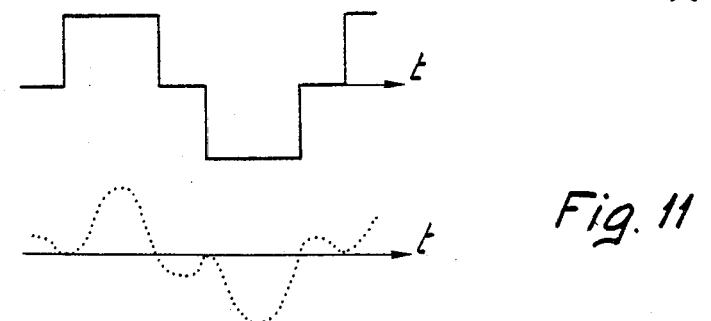
FIG. 11 shows an example of pulses applied to the motor according to the second form of the invention in the case of operation at high speed with slaving.

FIG. 11 shows how it is possible to drive the rotor in the forward direction and at high speed. The alternating pulses U(g) are caused to approach one another, without however completely connecting, in order to allow the rotor the time necessary to reach point $S_2$. As in the preceding case, the winding $p_1$ is employed to slave the operation of the motor.

Figure 10B:
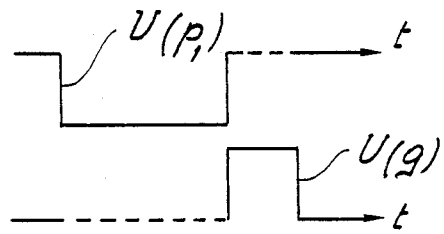

In the reverse operation, the graph of FIG. 9 and the pulses as shown in FIG. 10b show that initially one energizes the winding $p_1$ by the voltage U($p_1$) capable of developing the couple $C_5$ (identical to the trace of the couple - Cab($p_1$) in order to cause the rotor to turn in the reverse sense approximately 90° (point $I_1'$). Following this, the winding g, which is energized by voltage U(g), develops couple $C_6$ (identical to the trace of the couple Cab(g) ) sufficient to bring the rotor to its new position $S_2'$.

The motor which has just been described by these two principal variants enables one to envisage a number of possibilities of operation, certain of which have been described here in detail. It will be noted above all that, thanks to the four pole shoes, the forces exerted on the rotor are always balanced, which has as a result a considerable sparing of the rotor axis and its bearings.

What we claim is:

1. An electromagnetic stepping motor of the type responsive to sequences of energizing pulses and adapted in particular to drive a timepiece movement, said stepping motor comprising a stator and a rotor comprising a permanent magnet located in an opening of said stator, the magnetic circuit of said stator including a first winding and two second windings, each wound around a corresponding core, the axis of the core bearing said first winding being substantially perpendicular to the axes of the cores bearing said second windings, said stator having four pole shoes separated by saturable necks and cut-outs formed in the interior boundary wall of the stator opening which define a positioning angle for the rotor when the windings are not energized, the flux generated by energizing the first winding being separated into two substantially equal parts, the first of which is directly applied to the rotor via a first and a second pole shoe and the second of which passes through the core of each second winding in order to be applied to the rotor via a third and a fourth pole shoe thereby to subject the rotor to two magnetic fields which are substantially symmetric relative to two perpendicular axes.

2. An electromagnetic stepping motor as set forth in claim 1 wherein the first winding and the two second windings are energized in phase opposition whereby the resultant axis of the magnetic field generated by the first winding and that generated by said second windings are substantially perpendicular.

3. An electromagnetic stepping motor as set forth in claim 1 wherein the first winding and the two second windings are energized in phase whereby the resultant axis of the magnetic field generated by the first winding and that generated by said second windings energized in phase have the same sense and direction.

* * * * *